United States Patent [19]
Schweikl et al.

[11] 3,716,207
[45] Feb. 13, 1973

[54] AIRCRAFT WITH ONE OR SEVERAL TURBOJET ENGINES HOUSED IN THE FUSELAGE AFT SECTION IN PODS PROVIDED WITH THRUST-REVERSING DEVICES

[75] Inventors: Ludwig Schweikl, 8052 Moosburg; Alfred Japs, 8031 Grobenzell, both of Germany

[73] Assignee: Motoren-und Turbinen-Union Muenchen GmbH, Postfach, Munich, Germany

[22] Filed: May 27, 1970

[21] Appl. No.: 40,763

[30] Foreign Application Priority Data

May 29, 1969 Germany...................P 19 27 280

[52] U.S. Cl.................244/53 R, 60/229, 239/265.29
[51] Int. Cl..............................................B64d 27/00
[58] Field of Search...................244/53 R, 52, 110 B; 239/265.29, 265.17, 265.33, 265.37, 265.39, 265.41; 60/229, 230 R, 241

[56] References Cited

UNITED STATES PATENTS

| | | | |
|---|---|---|---|
| 3,266,734 | 8/1966 | Gahagan et al...................239/265.29 |
| 3,500,646 | 3/1970 | Hom et al.....................239/265.29 X |
| 3,172,256 | 3/1965 | Kerry et al..............................60/229 |
| 3,483,702 | 12/1969 | Ward......................................60/229 |
| 2,931,172 | 4/1960 | Billman...........................239/265.29 |
| 2,934,966 | 5/1960 | Wood..............................239/265.33 |

OTHER PUBLICATIONS

The Viggen Thrust Reverser System; Interavia, Vol. 24, No. 3; March 1969; pp. 276–277

Saab 37 Viggen; Interavia, Vol. 22, No. 5; May 1967; pp. 712–713

*Primary Examiner*—Trygve M. Blix
*Attorney*—Craig, Antonelli & Hill

[57] ABSTRACT

An aircraft with one or several turbo-jet engines arranged in the aft section of the fuselage or in pods and equipped with thrust-reversing devices which include rearwardly directed after-burner jet pipes with associated adjusting thrust nozzles; several gas discharge apertures are provided in the engine fairing which are adapted to be opened and closed by inner flaps and outer flaps or deflecting scoops constructed as component parts of the outer wall of the engine fairing; the inner flaps close the gas discharge apertures in the position for forward thrust conditions and open the same in the position for thrust reversal while simultaneously deflecting the engine gases in the direction of the gas discharge apertures; the outer flaps or deflecting scoops which open or close the gas discharge apertures operate in unison with the adjusting movement of the inner flaps; the thrust-reversing installation is arranged within an area directly upstream of the adjusting thrust nozzle of the after-burner jet pipe of a respective engine while the inner flaps form triangular sectors of the after-burner jet pipe wall and the associated heat shield which substantially completely close the after-burner jet pipe by the circular area formed thereby when the outer flaps or deflecting scoops are in the fully open position.

9 Claims, 7 Drawing Figures

PATENTED FEB 13 1973

AIRCRAFT WITH ONE OR SEVERAL TURBOJET ENGINES HOUSED IN THE FUSELAGE AFT SECTION IN PODS PROVIDED WITH THRUST-REVERSING DEVICES

This invention relates to an aircraft with one or several turbojet engines housed in the fuselage aft section or in pods and equipped with thrust-reversing devices, which are provided with rigidly mounted, rearwardly directed afterburner jet pipes with associated variable thrust nozzles, whereby several gas discharge apertures or ducts are provided in the engine fairing formed by the aft section of the fuselage or the pod, respectively, with associated inner flaps which, under pure forward thrust conditions, close the discharge apertures or ducts and which open these apertures or ducts for the thrust-reversing operation and simultaneously deflect the engine propulsion gases in the direction of the gas discharge apertures or ducts, and in which outer flaps or deflecting scoops to be operated in conjunction with the actuating motion of the inner flaps and associated with the gas discharge apertures or ducts, which can be opened or closed, are provided as component parts of the outer wall of the engine fairing.

In the past, it has already been proposed for aircraft turbojet engines to arrange the thrust-reversing device upstream of the jet pipe provided with means for afterburning.

In this prior art arrangement, the thrust-reversing device consists of two eyelid-type shells mounted for rotation about an axis transverse to the extended longitudinal axis of the engine, which in their position for forward thrust, close the gas discharge apertures or ducts of a pipe section and of the associated engine fairing so that the gas stream has free access to the afterburner jet pipe or which, as an alternative, by simultaneous inward pivoting action into the gas stream, can be pivoted together to abut at each other in order to close the forward (horizontal) thrust gas passage with simultaneous opening of the gas discharge apertures or ducts for the reversing operation.

This arrangement is advantageous in that the design of the afterburner jet pipe does not have to be modified since it does not carry the thrust-reversal equipment and is uninfluenced by the reversing operation.

A major disadvantage of the above-described known arrangement is, however, that the complete power plant requires a considerable installation length in the aft-section of the aircraft, i.e., a further space in the axial direction is required for the thrust-reversing device in addition to the afterburner pipe requiring already a considerable installation length in addition to the propulsion unit or power plant.

Moreover, this known arrangement of the power plant with the thrust-reversing device located as described results in a relatively high weight.

Furthermore, this known arrangement makes it necessary to deflect the gases at a location where the fuselage diameter is relatively large, since the thrust-reversing device is located upstream of the afterburner jet pipe; this is also a necessity because a relatively large flow section is required for the desired reduction in gas velocity in the region between the last engine turbine stage and the reheat or afterburner jet pipe.

In this known arrangement, however, the large flow section within this area calls for relatively large eyelids or shells, e.g., for sealing the reheat or afterburner jet pipe so that the engine gases are deflected to the gas discharge ducts or apertures for thrust reversal. The operation of such large dimensioned eyelids or shells again requires relatively large actuating forces.

Accordingly, it is the object of the present invention to eliminate the disadvantages of this known arrangement of a turbojet engine and to provide an aircraft turbojet power plant which, notwithstanding the presence of its thrust-reversal unit and jet pipe with means for the afterburning of the engine gases, requires less volume when installed, and above all is of shorter axial length combined with lower weight than the above known arrangement.

A further object of this invention is to provide a thrust-reversal unit which, during and after all operating conditions of a turbojet engine of the above type, ensures satisfactory operation of the thrust-reversal unit with relatively small operating forces, whereby the means for operating the thrust-reversal unit and the means for sealing the forward thrust gas flow and for simultaneously opening the gas discharge ducts or apertures for the thrust-reversal operation, can be arranged in a space-saving manner for a small installation volume, on the one hand, and for a free passage of the engine gases (i.e. with small flow losses) to the final or thrust nozzle during normal operation without thrust reversal.

As solution to the underlying problems, it is proposed according to the present invention that, for an aircraft with a turbojet engine of the aforementioned type, the thrust-reversal unit be arranged within an area directly upstream of the variable thrust nozzle of the afterburner jet pipe in each engine and that the inner flaps operated in conjunction with the outer flaps or deflecting scoops form triangular sectors of the reheat or afterburner jet pipe wall and of the associated heat shield, which progressively reduce the jet pipe flow section as the outer flaps or deflecting scoops gradually open the gas discharge apertures or ducts, whereby, with the outer flaps or deflecting scoops fully opened, these sectors form a circular area completely sealing the afterburner jet pipe section.

In an advantageous embodiment of the present invention, rigidly mounted jet deflecting guide vane or cascade assemblies may be conventionally arranged within the gas discharge apertures or ducts of the engine fairing.

In addition to the jet directing or deflecting effect of the opened outer flaps or scoops, these jet deflecting guide vanes or cascade assemblies direct the engine gases laterally away from fuselage tail or the pods in the forward direction at an angle to the engine longitudinal axis.

This invention also proposes appropriate means for operating the thrust-reversal unit, according to which one track for each of the gas discharge apertures or ducts is provided between the engine fairing and external jet pipe wall and a first bell-crank lever with a rotatably mounted roller at its end, is axially displaceably guided in the track, whereby the remaining free end of the first bell-crank lever fitted with another roller is displaceably guided in a track secured on the inner wall of an outer flap or a deflecting scoop, and whereby additionally, for the simultaneous operation of the outer flaps or deflecting scoops and the sectors of the jet pipe wall and of the heat shield, a second bell-crank lever is provided which, on the one hand, is pivoted with one end at the cranking point of the first bell-crank lever and which, on the other, is also axially movably guided in the guide track by means of a roller mounted at its cranking point; furthermore, the other free end of this second bell-crank lever is linked or pivotally connected to a sector of the jet pipe wall and of the heat shield.

These and further objects, features, and advantages of the present invention will become more obvious from the following description when taken in connection with the accompanying drawings which show, for purposes of illustration only, several embodiments of the present invention, and in which.

Figure 1:
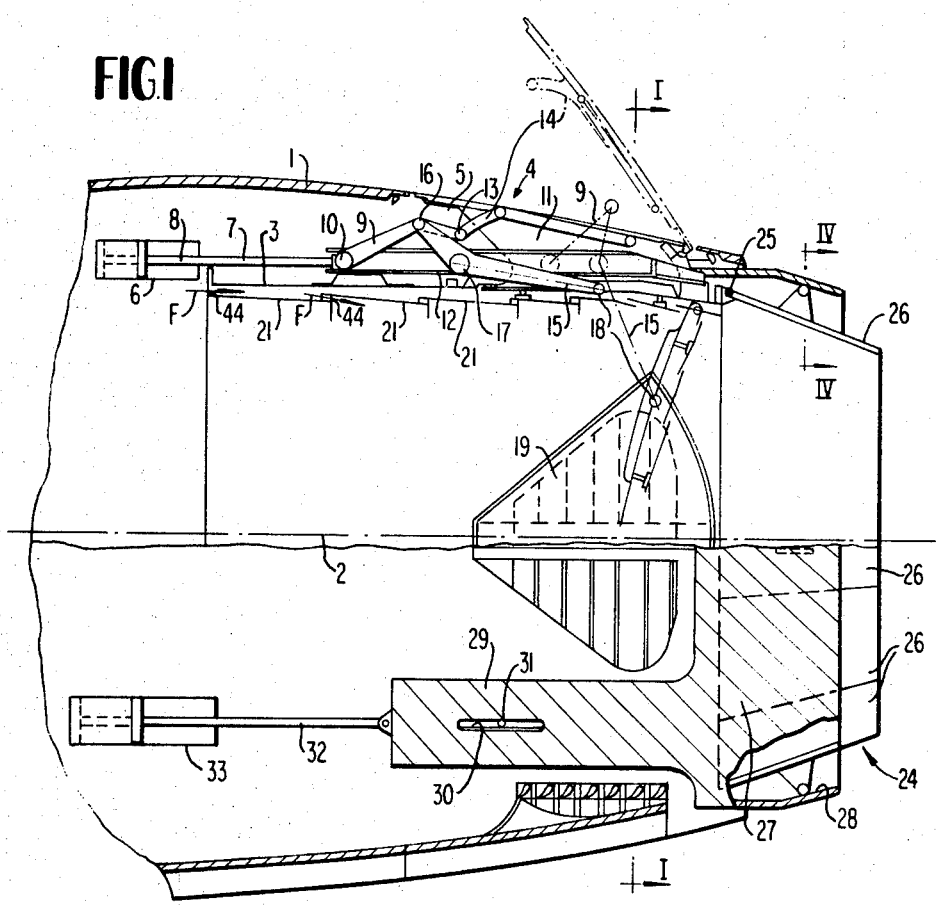
FIG. 1 is a cross-sectional view through the upper half of an aircraft fuselage along the longitudinal center line and the associated bottom half of this fuselage portion taken along line II—II of FIG. 2.

Referring now to the drawing wherein like reference numerals are used throughout the various views to designate like parts, and more particularly to FIG. 1, this figure illustrates a fuselage aft section with an engine fairing 1 arranged coaxially relative to longitudinal center line 2 of an afterburner jet pipe 3. In the upper half of FIG. 1, the means for operating a thrust-reversal unit generally designated by reference numeral 4 as well as the means effecting thrust reversal are shown. As can further be seen from the upper half of FIG. 1, the means for operating or actuating the thrust-reversal unit 4 are substantially located between engine fairing 1 and the outer wall of the jet pipe 3 when the outer flap 5 is closed. The operation and actuation of the thrust-reversal unit 4 is as follows:

The extension 7 of the piston rod 8 of a hydraulically or pneumatically operated telescope-type ram or cylinder 6 acts upon a first bell-crank lever 9 which is axially displaceably guided within a track 12 associated with the gas discharge aperture or duct 11, by means of a roller 10. The other free end of the first bell-crank lever 9 is also guided in a track 14 secured to the inner wall of the outer flap 5, by means of a roller 13. A second bell-crank lever 15 is pivoted at cranking point 16 of the first bell-crank lever 9. The second bell-crank lever 15 is also axially displaceably arranged in the track 12 by means of the roller 17. The other free end of the second bell-crank lever 15 is pivotally connected at point 18 to the outer wall of a triangular sector 19 of the jet pipe wall. This sector 19 is associated with a congruent surface component part 20 (FIG. 3) of the heat shield 21 (FIG. 1) of the afterburner jet pipe 3. Thus, when the piston rod 8 extends fully to the right from the telescope-type ram 6, the first and second bell-crank levers 9 and 15 are in their end position as indicated in dash and dotted lines while in this case the outer flap 5 has almost reached its fully open position; at the same time, the sector 19 including the jet pipe wall and the surface portion 20 of the heat shield 21 have reached a position where the afterburner jet pipe 3 is almost fully closed. The above-described operating mechanism of the thrust-reversal unit 4 can be associated by itself with a respective gas discharge aperture or duct 11; depending upon the arrangement of the aircraft wings 22, 23 (FIGS. 6 and 7), several of these gas discharge apertures or ducts 11, 11', which can be opened or closed, can be provided in the engine fairing 1, 1' in the fuselage aft section; in the case considered three or four of these ducts are provided.

Where several gas discharge apertures or ducts 11, outer flaps 5, sectors 19 and telescopic-type rams 6 for the operation of outer flaps 5 and sectors 19 are provided, it is desirable to synchronize in a conventional manner the operating movement of the individual telescopic-type rams 6.

Figure 6:
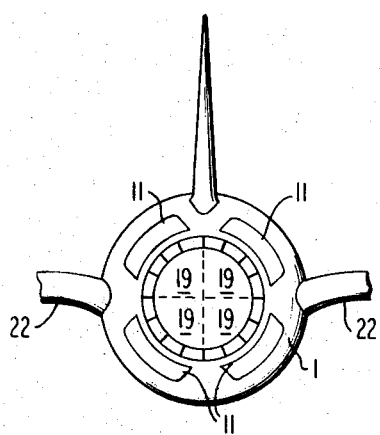
FIG. 6 is an end elevational view of a first application of the invention in an aircraft viewed from the rear thereof.
Figure 7:
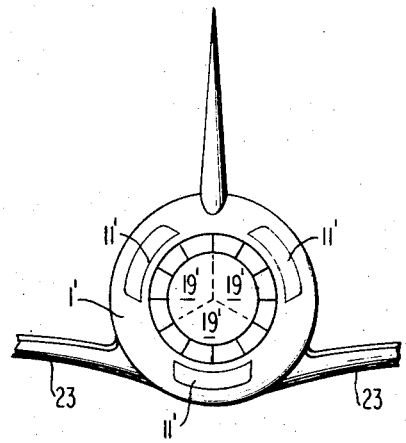
FIG. 7 is an end elevational view of a second application of the invention in an aircraft, also viewed from the rear thereof.

From FIG. 7, it can be further seen that to each gas discharge aperture or duct 11' is coordinated a sector 19' formed by the jet pipe wall and the heat shield so that, for example, in the case of three gas discharge apertures or ducts 11' (FIG. 7), three of such sectors 19' can completely close and seal the jet pipe, within which they form a complete circular area. Where four gas discharge apertures or ducts 11 (FIG. 6) are used, four of such sectors 19 completely close and seal the jet pipe 3 with the outer flaps 5 (FIG. 1) fully opened.

Figure 2:
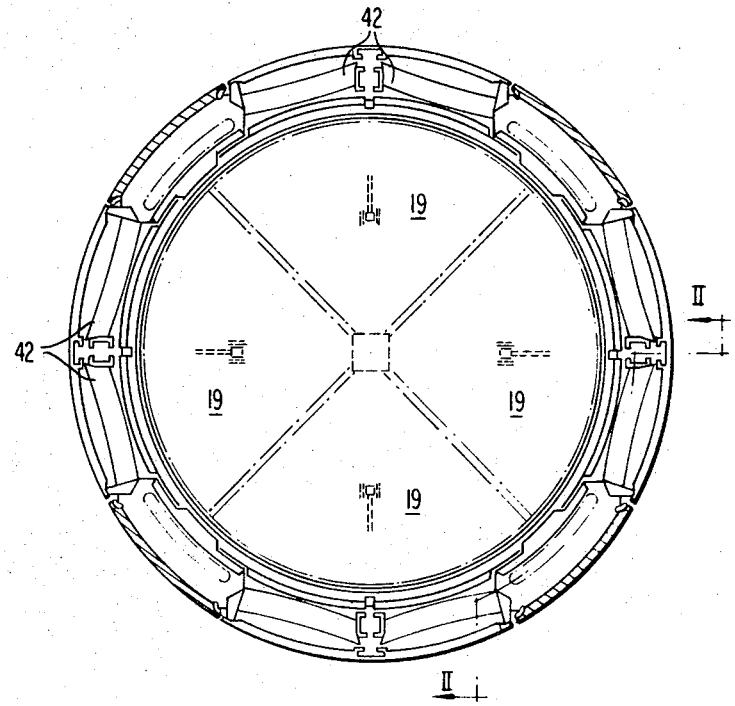
FIG. 2 is a cross-sectional view along line I—I of FIG. 1.

The bottom half of FIG. 1 generally shows the operating and adjusting means for a variable thrust nozzle 24 mounted downstream of the afterburner jet pipe 3 along the section line II—II of FIG. 2. For increasing or reducing the nozzle section in the case of the embodiment considered (FIG. 1), for example, nozzle flaps 26 are provided mounted for rotation about axes 25 transverse to the jet pipe center line 2, which, for reducing the gas outlet section, can be swivelled or pivoted into the gas stream and, for increasing the section, can be all together pivoted simultaneously outwards. For this purpose, a so-called nozzle-actuating skirt 27 is provided, as can be seen from FIG. 1 (bottom half), enclosing with its slightly inwardly bent annular wall 28 the individual nozzle flaps 26, and which is axially movably guided and secured by arms 29 (see also FIG. 2), protruding into the engine fairing 1, by way of elongated holes 30, into which extend relatively fixed or stationary bolts 31. Upstream thereof, the arms 29 of the actuating skirt 27 are connected to piston rods 32 of other telescope-type rams or cylinders 33 which, depending upon the number of arms 29, are arranged equally spaced and coaxially to the jet pipe center line 2 within the engine fairing 1. This embodiment, however, is to be considered also only as an example as regards the actuation of the nozzle flaps 26 and particularly as regards the number of the telescope-type rams 33, since several telescopic rams can be replaced by a single actuating unit connected to the individual arms of this actuating skirt.

Figure 4:
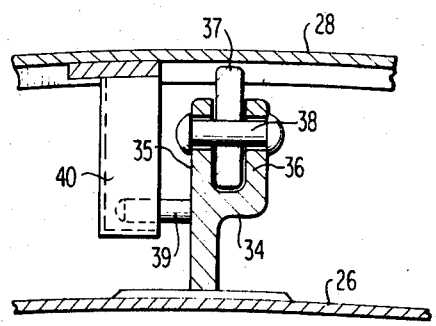
FIG. 4 is a cross-section taken along line IV—IV of FIG. 1.

The details illustrated in FIG. 4 show the actuating mechanism of a nozzle flap 26 and more particularly a bracket 34 is provided in the center of each nozzle flap, carrying a roller 37 between its free arms 35, 36 which is free to rotate on a pin 38. A pin 39 secured in the bracket 34 is enclosed by a guide 40 which is secured to the inwardly bent annular wall 28 of the actuating skirt 27. Thus, when telescopic-type ram 33 (FIG. 1) displaces the actuating skirt 27 to the right, at the same time the annular wall 28 of the actuating skirt 27 presses all nozzle flaps 26 simultaneously inwards by means of the rollers 37 and brackets 34, for example, when the gas outlet area is to be reduced. For increasing the gas outlet area, the actuating skirt 27 is moved toward the left by way of the telescopic-type rams 33 and the nozzle flaps are simultaneously further opened by means of the pins 39 secured to brackets 34 and by means of the guides 40, attached to annular wall 28.

Figure 3:
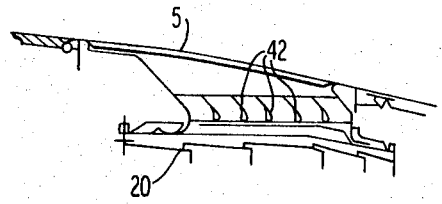
FIG. 3 is a partial cross-sectional view of an outer flap and of a sector of the jet pipe wall and of the heat shield including a deflection guide vane or cascade assembly as in FIG. 1, in the closed position thereof.
Figure 5:
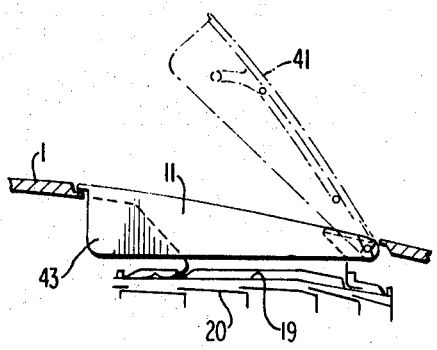
FIG. 5 is a partial cross-sectional view of a detail differing from FIG. 3 in that deflecting scoops are provided instead of outer flaps shown in FIGS. 1 and 3.

From FIG. 5, it can be seen that deflecting scoops 41 may be provided instead of the outer flaps 5 as shown in FIGS. 1 and 3. For this application, as shown in FIG. 5, deflecting guide vane or cascade assemblies 42 (FIG. 3) need not necessarily be mounted within the gas discharge ducts, since the side walls 43 of deflecting scoops 41 to a large extent assert or support the flow guidance of the gases. The operating mechanism for the deflecting scoops 41, for the sectors 19, 20 of the jet pipe wall and of the heat shield (FIG. 5) can be selected according to the embodiments shown in FIGS. 1 and 2.

In contradistinction to the embodiments of FIGS. 1 to 3, it can also be assumed for the embodiments according to FIGS. 6 and 7 that deflecting scoops 41 are provided (FIG. 5) for the opening and closing of the gas discharge apertures or ducts 11, 11' within the engine fairing 1, 1'.

FIGS. 1, 2, 3, and 5 further illustrate that, according to the invention, in an aircraft equipped with a turbojet engine (not shown), with an afterburner jet pipe 3, with an associated variable thrust nozzle 24 and with a thrust-reversal unit 4, all of these aforementioned components of the power plant can be combined to form a compact propulsion unit, wherein the flow passage of the afterburner pipe is free from any obstacles affecting the gas flow, particularly with the thrust-reversing device 4 in an inoperative position, in which no thrust-reversal is desired, as can be seen from FIGS. 1, 3 and 5. There is no risk for the thrust-reversal unit 4 to fail, since under forward thrust conditions with the gas discharge apertures or ducts 11, 11' in the closed position, no components of the thrust-reversal unit 4 will project into the hot gas stream and since the operating mechanism of the thrust-reversal unit 4 will, under forward thrust conditions, always be protected from the high temperature of the afterburner pipe, should the latter be engaged when required.

The heat shield 21 of the afterburner jet pipe 3, as shown in FIG. 1, can be conventionally cooled, if needed, from the outside in the direction of the arrows F by air bled from the compressor of the turbojet engine, not shown in the drawing. The compressor air used as a coolant flows through openings 44 in the heat shield 21 and, together with the hot engine gases, passes into atmosphere by way of the variable thrust nozzle 24.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An aircraft with at least one turbojet engine arranged in an engine fairing formed by the aft section of the fuselage or by the pod, which includes thrust-reversing means having rearwardly directed afterburner jet pipe means with associated thrust nozzle means, and in which several gas discharge aperture means are provided in the engine fairing with associated inner cover means and outer cover means, the inner cover means substantially closing the gas discharge aperture means in the position thereof for forward thrust conditions and opening the gas discharge aperture means in the position of thrust reversal while simultaneously deflecting the engine gases in the direction of the gas discharge aperture means, and said outer cover means being operable to open and close the gas discharge aperture means, characterized in that the thrust-reversal means is arranged within an area directly upstream of the thrust nozzle means of the afterburner jet pipe means of a respective engine, in that the inner cover means are operable to increasingly close the gas discharge out of the jet pipe means with increasing opening of the discharge aperture means by the outer cover means, the outer cover means being actuated in unison with the inner cover means with the inner cover means being inner flaps in the form of substantially triangular sectors of the afterburner pipe walls and of a heat shield associated therewith, said sectors forming a circular area substantially completely closing the afterburner jet pipe means in the fully open position of the outer cover means, and in that one guide track each, corresponding in number to the gas discharge aperture means, is provided between the engine fairing and an outer wall of the jet pipe means, a first bell-crank lever with a roller rotatably supported at one end which is axially displaceably guided in said guide track by means of the roller thereof, the other free end of the first bell-crank being provided with a further roller and being displaceably guided in a further guide track, and means for the simultaneous adjustment of the outer cover means with the inner cover means including a second bell-crank pivotally connected with one end thereof at the cranking point of the first bell-crank lever, on the one hand, and axially displaceably guided in said first-mentioned guide track by means of a roller supported at the cranking point thereof, on the other, the other free end of said second lever being pivotally connected with a sector of the jet pipe wall and heat shield forming part of the inner cover means.

2. An aircraft according to claim 1, characterized in that the outer cover means form component parts of the outer wall of the engine fairing.

3. An aircraft according to claim 2, characterized in that fixedly mounted deflecting guide vane means are arranged on the inside of the gas discharge aperture means.

4. An aircraft with at least one turbojet engine arranged in an engine fairing formed by the aft section of the fuselage or by the pod, which includes thrust-reversing means having rearwardly directed afterburner jet pipe means with associated thrust nozzle means, and in which several gas discharge aperture means are provided in the engine fairing with associated inner cover means and outer cover means, the inner cover means substantially closing the gas discharge aperture means in the position thereof for forward thrust conditions and opening the gas discharge aperture means in the position of thrust reversal while simultaneously deflecting the engine gases in the direction of the gas discharge aperture means, and said outer cover means being operable to open and close the gas discharge aperture means, characterized in that the thrust-reversal means is arranged within an area directly upstream of the thrust nozzle means of the afterburner jet pipe means of a respective engine, in that the inner cover means are operable to increasingly close the gas discharge out of the jet pipe means with increasing opening of the discharge aperture means by the outer cover means, and in that one guide track each, corresponding in number to the gas discharge aperture means, is provided between the engine fairing and an outer wall of the jet pipe means, a first bell-crank lever with a roller rotatably supported at one end which is axially displaceably guided in said guide track by means of the roller thereof, the other free end of the first bell-crank being provided with a further roller and being displaceably guided in a further guide track, and means for the simultaneous adjustment of the outer cover means with the inner cover means including a second bell-crank pivotally connected with one end thereof at the cranking point of the first bell-crank lever, on the one hand, and axially displaceably guided in said first-mentioned guide track by means of a roller supported at the cranking point thereof, on the other, the other free end of said second lever being pivotally connected with the inner cover means.

5. An aircraft according to claim 4, characterized in that said thrust nozzle means is adjustable and includes nozzle flap means, and actuating means for actuating said nozzle flap means.

6. An aircraft according to claim 5, wherein the actuating means for the nozzle flap means includes a bracket mounted substantially centrally of each nozzle flap means having free arms and a roller supported between said free arms on a pin, a further pin secured in said bracket and guide means for guiding said pin and secured at the inwardly curved annular wall of an adjusting member operatively connected with the nozzle flap means.

7. An aircraft according to claim 6, characterized by cooling means for cooling the inner walls of said afterburner jet pipe means which include a heat shield.

8. An aircraft with at least one turbojet engine arranged in an engine fairing formed by the aft section of the fuselage or by the pod, which includes thrust-reversing means having rearwardly directed afterburner jet pipe means with associated thrust nozzle means, and in which several gas discharge aperture means are provided in the engine fairing with associated inner cover means and outer cover means, the inner cover means substantially closing the gas discharge aperture means in the position thereof for forward thrust conditions and opening the gas discharge aperture means in the position of thrust reversal while simultaneously deflecting the engine gases in the direction of the gas discharge aperture means, and said outer cover means being operable to open and close the gas discharge aperture means, characterized in that the thrust-reversal means is arranged within an area directly upstream of the thrust nozzle means of the afterburner jet pipe means of a respective engine, and in that the inner cover means are operable to increasingly close the gas discharge out of the jet pipe means with increasing opening of the discharge aperture means by the outer cover means, said thrust nozzle means being adjustable and including nozzle flap means, and actuating means for actuating said nozzle flap means, the actuating means for the nozzle flap means including a bracket mounted substantially centrally of each nozzle flap means having free arms and a roller supported between said free arms on a pin, a further pin secured in said bracket and guide means for guiding said pin and secured at the inwardly curved annular wall of an adjusting member operatively connected with the nozzle flap means.

9. An aircraft according to claim 8, characterized by cooling means for cooling the inner walls of said afterburner jet pipe means which include a heat shield.

* * * * *